United States Patent

Struszczyk et al.

[11] Patent Number: 6,106,763
[45] Date of Patent: Aug. 22, 2000

[54] PROCESS FOR PRODUCING CELLULOSIC MOULDINGS

[75] Inventors: Henryk Struszczyk, Zgierz; Dariusz Wawro, Lodz; Pawel Starostka, Lodz; Wlodzimierz Mikolajczyk, Lodz; Alojzy Urbanowski, Lodz, all of Poland

[73] Assignees: Institute of Chemical Fibres, Lodz, Poland; Lurgi Zimmer AG, Frankfurt am Main, Germany

[21] Appl. No.: 09/192,772

[22] Filed: Nov. 16, 1998

[30] Foreign Application Priority Data

Nov. 20, 1997 [PL] Poland ..................... 323281
Feb. 17, 1998 [PL] Poland ..................... 324910

[51] Int. Cl.$^7$ ............... B29C 55/28; D01F 2/00
[52] U.S. Cl. .......... 264/563; 264/102; 264/187; 264/209.5; 264/211.14
[58] Field of Search .................. 264/102, 187, 264/209.5, 211.14, 563

[56] References Cited

U.S. PATENT DOCUMENTS

4,634,470  1/1987  Kamide et al. ............. 106/204.01
5,401,447  3/1995  Matsui et al. ............. 264/187 X

FOREIGN PATENT DOCUMENTS

167519  10/1992  Poland .
167776  10/1992  Poland .

OTHER PUBLICATIONS

Yamashiki, Takashi et al., Some Characteristic Features of Dilute Aqueous Alkali Solutions of Specific Alkali Concentration (2.5 moll–1) Which Possess Maximum Solubility Power Against Cellulose, Polymer Journal, vol. 20, No. 6, pp. 447–457 (1988).

Yamashiki, T. et al., Cellulose Fiber Spun From Gelatinized Cellulose/Aqueous Sodium Hydroxide System by the Wet–Spinning Method, Cellulose Chem. Technol., 24, pp. 237–249 (1990).

*Primary Examiner*—Leo B. Tentoni
*Attorney, Agent, or Firm*—Howard M. Ellis; Marianne Fuierer

[57] ABSTRACT

Process for producing cellulosic moldings such as fibers, foils, casings and beads from cellulose, wherein (a) the initial cellulose is hydrothermally treated with water in a water/cellulose ratio on a weight basis of at least 1 at a temperature in the range from about 100° to about 200° C. and under a pressure in the range from 0.1 to about 1.5 MPa; (b) the treated cellulose is dissolved in an aqueous solution of alkali hydroxide at a temperature of at least 0° C. to form a homogenous cellulose solution containing from about 5% to about 10% by weight cellulose and at maximum 10% by weight alkali hydroxide, and (c) the alkaline cellulose solution is formed and coagulated by contacting it with an aqueous solution containing 1 to about 30% by weight of an acid. This fully ecological process avoids handling of toxic products or by-products and uses aqueous solvents instead of expensive organic solvents. The cellulose solution is stable for at least 48 hours.

19 Claims, No Drawings

PROCESS FOR PRODUCING CELLULOSIC MOULDINGS

FIELD OF THE INVENTION

The present invention relates to a process for producing cellulosic moldings such as fibers, foils, casings, beads etc. from cellulose.

BACKGROUND OF THE INVENTION

U.S. Pat. No. 4,634,470, corresponding to Japanese Patent Specification No. 58-244337 as well as publications in "Polymer Journal", Vol. 20, pp. 447–457, 1988, and in "Cellulose Chemistry and Technology", Vol. 24, pp. 23–31, 237–249, 1990, disclose a process of manufacturing cellulose fibers from cellulose pulp by means of the steam explosion method. In this process cellulose is initially treated in an alkaline or acid medium to obtain a polymer with an average degree of polymerization of 200–700, and then this polymer is subjected to a steam explosion treatment at temperatures in the range from 100 to 350° C. under pressures of 1.01 to 2.53 MPa. The treated cellulose dissolves in an aqueous alkaline solution from which fibers can be made by coagulation in an acid coagulation bath. This process does not allow one to obtain modified cellulose with sufficiently high solubility in alkaline solutions. Moreover, the process is technologically and mechanically complicated and energy-consuming.

Polish Patent Specifications No. 167776 and 167519 as well as Finnish patent applications No. 911408 and 910990 specify a method of production of fibers, foils and other products from soluble cellulose obtained on the way of enzymatic treatment by means of cellulolytic enzymes of the cellulase type originated from fungi *Aspergillus Niger* IBT. The enzymatic treatment of cellulose pulp is carried out at temperatures not lower than 10° C. in a time not shorter than 1 minute at a pH as high as 4–7. This modified cellulose dissolves in aqueous alkali solutions at a temperature from 10° C. to 10° C. in 15 to 2880 minutes. The obtained cellulose solution is filtered and deaerated and then subjected to coagulation in an acid bath.

The enzymatic method causes difficulties in obtaining a high degree of solubility of the modified cellulose and needs the use of expensive enzymes. The preparation of the cellulose spinning solution requires a long stirring time and a low storage temperature while the solution obtained is characterized by poor stability.

DETAILED DESCRIPTION OF THE INVENTION

One object of the invention is to provide a process for producing cellulose moldings, especially fibers, foils, casings, beads, etc., from a cellulosic solution which avoids the above-mentioned drawbacks of the known processes.

A further object of the invention is to provide a process for producing cellulose moldings from a cellulose sufficiently soluble in an alkaline solution.

Another object of the present invention is to provide a process for producing cellulosic fibers, foils, casings, beads, etc. from cellulose which process is technologically simple, ecologically safe without the use of toxic substances, and inexpensive by high energy or enzyme consumption.

These and other objects are achieved according to the present invention. The invention provides an improved process for producing moldings, such as fibers, foils, casings, beads and other articles from cellulose, wherein (a) the initial cellulose is hydrothermally treated with water in a water/cellulose ratio on a weight basis of at least 1 at a temperature in the range from about 100 to about 200° C. and under a pressure in the range from about 0.1 to about 1.5 Mpa, (b) the treated cellulose is dissolved in an aqueous solution of alkali metal hydroxide at at least 0° C. to a homogeneous cellulose solution containing from about 5 to 10% by weight cellulose and at maximum 10% by weight alkali metal hydroxide, and (c) the alkaline cellulose solution is formed and coagulated by contacting it with an aqueous solution containing from about 1 to about 30% by weight inorganic and/or organic acid.

Preferably, the temperature in the step (a) for the hydrothermal treatment of the cellulose pulp is in the range from about 100 to about 160° C. The water/cellulose ratio on a weight basis is preferably not less than 15:1 and especially lies in the range from about 15:1 to about 50:1. The process of the invention brings about a hydrolytic modification of the cellulose pulp which becomes apparent by the reduction of the value of its average degree of polymerization and the disarrangement of the bonds between cellulose chains, most of which are hydrogen bonds. This hydrolytically modified cellulose with changed molecular and supermolecular structure is characterized by its ability to be directly dissolved in aqueous alkaline solutions to form stable spinning dopes of appropriate viscosity. These cellulosic solutions are designated for producing fibers, foils, casings, beads, etc. The modified cellulose dissolves in aqueous alkaline solutions.

The aqueous solution used in step (c) for coagulating the cellulose of the alkaline cellulose solution contains the commonly used acids selected from the group consisting of sulfuric acid, hydrochloric acid, acetic acid, and mixtures thereof.

The process of the invention allows the use of an initial cellulose pulp for the hydrothermal treatment which has not been previously dried.

Preferably, the cellulose solution is filtered and/or deaerated between steps (b) and (c). This is useful for preparing a dope for a trouble-free forming step (c), especially a spinning or an extruding step. Preferably, a cellulose solution having a filterability coefficient not higher than 1000 and a stability at 20° C. of at least 48 hours is produced in step (b). By the filtration of the solution the filterability coefficient is decreased to a value between 0 and about 50. The stability of the spinning solution for at least 48 hours is sufficient for carrying out the filtration and/or deaeration of the solution and formation of the cellulose products. Usually the cellulose products coagulated in step (c) are subsequently washed with water and dried.

According to a preferred embodiment of the process of the invention the duration of the hydrothermal treatment is from about 1.0 to about 10 hours, and more preferably, in the range from about 2 to about 6 hours.

A further feature of the process of the invention resides in the mixture of cellulose and water at the end of the hydrothermal treatment is non-explosively depressurized to the atmospheric pressure. The hydrothermal step (a) can be carried out in an autoclave of conventional design. Depressurizing the hydrothermal treatment mixture is achieved by blowing off the water vapor from the mixture when the valve of the autoclave is opened. Conveniently, the hydrothermal treatment mixture is depressurized in a time interval in the range from about 1 to about 30 minutes, especially about 5 to about 15 minutes. The depressurization time depends on the pressure under which the hydrothermal treatment is carried out, and on the volume of the charge. The depressurization rate should be limited so that the treated cellulose is not discharged together with vapor blown off.

Preferably, the hydrothermal treatment of the step (a) is carried out at a temperature in the range from about 120 to about 180° C., especially at a temperature in the range from about 145 to about 165° C. Preferably, the hydrothermal treatment is carried out at a pressure in the range from about 0.2 to about 1.0 MPa, particularly in the range from about 0.35 to about 0.55 MPa.

The time necessary for preparing the cellulose solution in the step (b) is generally in the range from 1 to about 300 minutes, preferably in the range from about 15 to about 120 minutes.

According to a preferred embodiment of the invention it is provided that prior to step (a) the initial cellulose is subjected to a defibration and swelling treatment at the temperature of at least 10° C. during a time in the range from 1 minute to 24 hours in the presence of water. This pretreatment prior to the hydrothermal step causes a loosening of the cellulose chains for the subsequent action of highly energized water molecules penetrating the structure of the polymer and breaking intermolecular hydrogen bonds. This pretreatment is advantageously carried out with agitation.

Preferably a cellulose having an average weight degree of polymerization not lower than 200, a retention value in the range from about 60% to 100%, a crystallinity index not higher than 75% and a value of hydrogen bond energy in the range from about 15 to about 21 KJ/mole is obtained by the hydrothermal treatment in the step (a).

In a further embodiment of the process of the present invention in the step (b) the cellulose is dissolved in an alkali hydroxide solution which contains at maximum 5% by weight zinc compounds and/ or at maximum 10% by weight urea. Zinc oxide is the preferred zinc compound which is advantageously used in the coagulation bath. The addition of zinc compounds and/or urea to the alkali hydroxide solution increases the stability of the solution. According to a further preferred embodiment of the invention the cellulose solution in step (c) is coagulated in an aqueous acid solution containing 1 to about 25% by weight salts of organic and/or inorganic acid(s). Preferred salts for use in the coagulation bath are sodium acetate, sodium sulphate, aluminum sulphate, sodium chloride and aluminum chloride.

According to a further aspect of the invention, the above mentioned objects are achieved by a process for producing cellulose casings from cellulose, wherein (a) the initial cellulose is hydrothermally treated with water with a water/cellulose ratio on a weight basis of at least 1 at a temperature in the range from about 100 to about 200° C. and under a pressure in the range from about 0.1 to about 1.5 MPa, (b) the treated cellulose is dissolved in an aqueous solution of alkali metal hydroxide at at least 0° C. to form a homogeneous cellulose solution containing from about 5 to about 10% by weight cellulose and at maximum 10% by weight alkali metal hydroxide, (c) the alkaline cellulose solution is extruded through an annular nozzle into a coagulation bath consisting of an aqueous solution containing from about 5 to about 30% by weight inorganic and/or organic acid to form a casing, and a coagulation bath liquor containing from about 5 to about 20% by weight acid and from about 5 to about 25% by weight sodium salt(s) and having a temperature in the range from about 20 to about 95° C. is introduced into the interior of the casing, (d) the coagulated cellulose casing is drawn in the range up to 100% of its original length in an aqueous bath at a temperature in the range from about 20 to about 95° C., and (e) the casing is treated with polyhydric alcohol(s) at a temperature in the range from about 20 to about 80° C. after having removed the internal coagulation bath from it.

According to this aspect of the invention the formed tubular casing is contacted in step (c) not only with an exterior coagulation bath but also with a coagulation bath liquor which is introduced into the casing via the extrusion nozzle. The used interior coagulation bath liquor is withdrawn via the nozzle so that an exchange of coagulation liquor is maintained in the interior of the casing. The acids to be used in the interior coagulation bath can be the same as used in the exterior bath namely inorganic acids, preferably sulfuric acid and/or organic acids, preferably acetic acid. The interior coagulation bath contains sodium salt(s) of inorganic and/or organic acids, preferably sodium sulphate or sodium acetate. The interior coagulation liquor can contain urea in the same quantities as indicated here-above.

The coagulation of the cellulosic casing in step (c) is carried out with an exterior bath temperature in the range from about 20 to about 95° C. The exterior coagulation bath preferably contains from about 5 to about 30% by weight of an acid, preferably sulphuric acid and/or acetic acid, from about 1 to about 25% by weight sodium salt, advantageously sodium sulphate or sodium acetate as well as possibly urea in quantities of about 0.1 to about 10% by weight.

The formed cellulose casing is subjected to stretching in the range from 0.1 to 100% (stretch ratio 1:1 to 2:1). The stretching is performed in an aqueous bath with possible addition of an acid in an amount not greater than 10% by weight. After having removed excessive acid bath from the coagulation and/or the stretching step the casing is subjected to a plastification by contacting it with a polyhydric alcoholic medium at a temperature in the range from about 20 to about 80° C. The polyhydric alcoholic medium is an aqueous solution of the alcohol(s). The preferred concentration of the polyhydric alcohol(s) in the solution of the plastification bath is in the range from about 2 to about 50% by weight, and particularly from about 5 to about 20% by weight. The final step comprises one or more finishing treatments selected from the group consisting of washing with water, wrinkling and drying.

In the process of the invention a simultaneous coagulation and regeneration of both the outside and the inside layers of the formed casing takes place as a result of the application of the two coagulation baths. This prevents sticking of the inside of the casing when being flattened.

The process of the invention provides for cellulose casings intended most of all for food packaging. The advantages of this process are (i) a fully ecological process without handling toxic products or by-products;

(ii) the use of cheap aqueous solvents instead of expensive organic solvents;

(iii) the formation of a stable true solution of cellulose without the necessity of preparing a cellulose derivative; and (iv) the stability of the solution for at least 48 hours which is sufficient for their filtration, deaeration and further processing to form fibers, casings, beads, and the like.

The process of the invention enables the formation of both simple and wrinkle cellulose casings using fully ecological and technologically simple process steps.

For the determination of the properties of cellulose and the products made of it the following methods were used:

average degree of polymerization $\overline{DP}_w$ was determined according to the method described in the periodical Das Papier, no. 12, page 187, 1958;

water retention value WRV was determined according to the method described in the periodical Cellulose Chemistry and Technology, vol. 14, page 893, 1980;

crystallinity index KrI was determined according to the X-ray method specified in the monograph Mikrostruktura Wlokna, Wydawnictwo Naukowo-Techniczne, Warszawa, page 68, 1988:

filterability coefficient $K_w^*$ was determined according to the standard BN-70/7516-03; and mechanical properties of the fibers and foils such as tenacity, etc., were determined according to the standards PN-83/P-04653 and PN-84/P-04654.

The subject of the invention is illustrated in more detail by the following examples which are intended not to restrict the scope of the invention.

EXAMPLE 1

200 parts by weight of air-dry cellulose pulp of the Ketchikan type in form of sheets characterized by an average weight degree of polymerization $\overline{DP}_w=577$, a crystallinity index KrI=72%, a water retention value WRV=60% and a hydrogen bond energy $E_H=12.3$–14.5 kJ/mole and a moisture content of 21.4% by weight were subjected to defibration in a mixer with 4000 parts by weight of water at 20° C. for 10 minutes. The obtained dispersion was left at this temperature for 16 hours for swelling of the cellulose fibers and then put into an autoclave and subjected to a hydrothermal treatment at 151° C. under a pressure of 0.4 MPa for 3 hours. Then the cellulose dispersion was filtered, washed with water and dried 6 hours at 46° C. 200 parts by weight of modified cellulose pulp containing 10% by weight moisture and having an average weight degree of polymerization $_{DP_w}=393$, a w crystallinity index KrI=70%, a WRV= 63% and an $E_H=15.64$–17.97 kJ/mole were obtained. Then 33 parts by weight of the modified pulp were introduced into a mixer containing 283 parts by weight of water at 3° C., after which under continuous stirring with 150 rpm 283 parts by weight of aqueous sodium hydroxide solution were introduced. The solution had a concentration of 18% by weight NaOH and a temperature of −5° C. and contained 0.13% by weight of zinc oxide. The process of dissolution of the cellulose in the sodium hydroxide solution was carried out for 30 minutes. An alkaline cellulose solution was obtained at a temperature of 6° C. characterized by an α-cellulose content of 5.11% by weight and a sodium hydroxide content of 8.68% by weight, a viscosity at 20° C. of 13 seconds, a maturity of 8.5°H*, as well as a reduced value of the filterability coefficient $K^*_w$ equal to 397. The solution was filtered through a plate filter and then deaerated at 15° C. for 16 hours. From this solution with a viscosity of 17s, a maturity of 6.5°H and a $K^*_w=9$ cellulose fibers were formed in an aqueous sulphuric acid solution in a concentration of 23% by weight at 20° C. with use of a 60-holes-spinning nozzle. The diameter of the holes was 0.08 mm and the linear speed was 11.5 m/min. The produced fibers were washed with water and dried.

Cellulose fibers were prepared with a tenacity in a conditioned state of 5.2 cN/tex, a loop tenacity of 3.6 cN/tex, an elongation of 29% and a WRV=116%.

EXAMPLE 2

200 parts by weight of air-dry cellulose pulp of the Ketchikan type having the properties as disclosed in Example 1 were subjected in a mixer to defibration in 3000 parts by weight of water at 20° C. for 10 minutes. The dispersion of cellulose pulp was maintained at this temperature for 16 hours and then put into an autoclave and subjected to hydrothermal treatment for 4.5 hours at 150° C. under a pressure of 0.41 MPa. After the end of the treatment the modified cellulose was washed with water and dried at 46° C. for 6 hours. 400 parts by weight of dried modified cellulose mass with a $\overline{DP}_w=307$, a KrI=67% and $E_H=15.86$–18.01 kJ/mole were introduced into a mixer containing 2890 parts by weight of water at a temperature of 7° C. and 330 parts by weight urea dissolved in it. Under continuous stirring 2710 parts by weight of an aqueous sodium hydroxide solution having a concentration of 18% by weight and a temperature of −10° C. and containing 1% by weight of zinc oxide were introduced into the mixer. The process of dissolution of the cellulose in the sodium hydroxide solution was continued for 60 minutes. An alkaline cellulose solution at 8° C. containing 6.13% by weight of α-cellulose and 8.74% by weight of sodium hydroxide was obtained, The solution was characterized by a viscosity at 20° C. of 16 seconds and a maturity of 6.0°H*. The solution was subjected to filtration on a frame press and then deaerated at 13° C. for 16 hours. From the so prepared solution with a viscosity of 32 seconds, a maturity of 6.0°H* and a filterability coefficient of $K_w+$ equal to 0 cellulose fibers were formed in a three-bath-system using as the first bath an aqueous solution of 23% b.w. sulphuric acid and 5% by weight sodium sulphate at 28° C., and as the second and the third bath distilled water at a temperature of 25° C. The fibers were formed using a platinum-rhodium nozzle with a hole diameter of 0.6 mm and a linear speed of 40 m/min. The produced fibers were washed with water and dried.

Cellulose fibers were prepared with a linear mass of 1.67 dtex, a tenacity in a conditioned state of 12.2 cN/tex, a loop tenacity of 2.87 cN/tex, an elongation of 12.6% and a WRV=106%.

EXAMPLE 3

Cellulose pulp having the properties as in Example 1 was subjected to defibration, hydrothermal treatment and dissolution in an aqueous sodium hydroxide solution as in Example 2. After filtration and de-aeration an alkaline cellulose solution was obtained as in Example 2. From the solution cellulose fibers were formed in a three-bath-system. As the first bath an aqueous coagulation solution was used containing 20% by weight of sulphuric acid, 24% by weight of sodium sulphate and 10% by weight of aluminum sulphate. As the second bath water was used at 30° C., and as the third bath water was used at 40° C. The fibers were formed using a platinum-rhodium nozzle as in Example 2. The produced fibers were washed in water and dried.

Cellulose fibers were prepared with a linear mass of 2.25 dtex, a tenacity in a conditioned state of 10 cN/tex, a loop tenacity of 4.22 cN/tex, an elongation of 15.6% and a WRV of 111%.

EXAMPLE 4

200 parts by weight of air-dry cellulose pulp of the Ketchikan type having the properties as in Example 1 were subjected in a mixer to defibration in 4000 parts by weight of water at 25° C. for 20 min. The aqueous dispersion of the cellulose was left at this temperature for 24 hours. Then it was put into an autoclave and subjected to a hydrothermal treatment for 3 hours at 160° C. under a pressure of 0.5 MPa. At the end of the reaction the modified cellulose was washed with water and dried for 6 hours at 46° C. Then the modified cellulose with $\overline{DP}_w$=290, KrI=67% and EH=15.97–17.08 kJ/mole was dissolved in an aqueous sodium hydroxide solution as in Example 1 containing urea. The obtained alkaline cellulose solution contained 5.96% by weight of α-cellulose and 8.52% by weight of sodium hydroxide with a viscosity equal to 16 seconds and a maturity of 6° H*. The solution was subjected to the filtration and formation as in Example 2.

There were obtained cellulose fibers with a linear mass of 3.27 dtex, a tenacity in a conditioned state of 9.11 cN/tex, a loop tenacity of 2.17 cN/tex, an elongation of 15% and a WRV of 105%.

EXAMPLE 5

From the alkaline cellulose solution obtained in Example 4 a cellulose foil was formed using a slot nozzle with the dimensions 35 mm×0.1 mm with a speed of 35 m/min. The coagulation bath was at 21° C. and contained 14% by weight of sulphuric acid and 8% by weight of sodium sulphate. Water at 60° C. was used as a second coagulation bath. In this bath 100% stretching was carried out.

A foil was fabricated with an average thickness of 0.015 mm, a strength of 36 MPa and an elongation of 6%.

EXAMPLE 6

Hydrothermally modified cellulose produced as in Example 4 was dissolved in an aqueous sodium hydroxide solution under the conditions as in Example 2. From the obtained alkaline cellulose solution containing 6.98% b.w. of α-cellulose and 8.9% b.w. of sodium hydroxide with a viscosity of 44 seconds at 20° C., a maturity of 6.0°H* and a $K_w$*=90, foils were produced under laboratory conditions by spreading the solution on glass plates. The films were subjected to coagulation in a bath containing 30% by weight of sulphuric acid and subsequently washed with water under a gentle stress state at room temperature.

A cellulose foil was fabricated with an average thickness of 0.015 mm, a strength of 64 MPa and an elongation of 2.8%.

EXAMPLE 7

From the alkaline cellulose solution obtained in Example 6 beads were formed by means of a device provided with a multi-hole spinneret with a diameter of 0.5 mm in a coagulation bath consisting of aqueous 30% b.w. hydrochloric acid solution containing 6 g/l of hydrogen peroxide as a blowing agent. The produced porous cellulose globules were washed in water and subsequently dried in a lyophilizing drier.

Globules with a diameter of 3 mm and a WRV=162% were prepared.

EXAMPLE 8

Hydrothermally modified cellulose produced as in Example 4 was dissolved in an aqueous 9.0% b.w. sodium hydroxide solution as in Example 2 with an increased concentration of α-cellulose in the solution. From the obtained alkaline cellulose solution containing 7.15% by weight of α-cellulose and 8.90% by weight of sodium hydroxide with a viscosity equal to 49 seconds at 20° C., a maturity of 6.0°H* and a $K_w$*=287 a foil was produced under laboratory conditions and subjected to coagulation in a bath containing 30% by weight of sulphuric acid at 15° C.

A cellulose foil was prepared with an average thickness of 0.016 mm, a strength of 82 MPa and an elongation of 5.3%.

EXAMPLE 9

200 parts by weight of the cellulose pulp of the Ketchikan type were pretreated and hydrothermally treated as specified in Example 1. 50 parts by weight of the modified pulp was put into a mixer containing 380 parts by weight of water at 3° C. Then under continuous agitation with 200 rpm 400 parts by weight of an aqueous 18% b.w. sodium hydroxide solution having a temperature of −5° C. and containing 0.13% by weight zinc oxide were introduced. The dissolution was continued for 30 minutes obtaining a alkaline cellulose solution at 6° C. characterized by an α-cellulose content of 6.0% by weight, a sodium hydroxide content of 8.0% by weight, a viscosity of 60 s, a maturity of 9°H* as well as a value of reduced filterability coefficient Kw* of 420. The solution was filtered through a plate filter. Then it was deaerated at a temperature of 15° C. for 24 hours. The so prepared solution of a viscosity of 72 s, a maturity of 7.5°H* and a Kw*=12 was formed into a casing using an annular nozzle and a coagulation bath of 20° C. containing 12% by weight of sulphuric acid, 5% by weight of sodium sulphate and 0.5% by weight of urea. Simultaneously a coagulation bath of 25° C. containing 5% by weight sulphuric acid and 25% by weight sodium sulphate was introduced into the interior of the formed casing. The produced casing was put into an aqueous bath at 50° C. containing 25% by weight sulphuric acid under a total stretch equal to 60%. Then the internal coagulation bath was removed and the casing was put into a plastification bath at 60° C. consisting of an aqueous 10% solution of glycerol and propylene glycol in a weight ratio of 1:1. After having contacted the plastification bath the cellulose casing was washed, once more a plastification avivage was applied containing an aqueous 20% solution of propylene glycol and the casing was dried.

There were obtained 58.5 parts by weight of cellulose casing containing 4.5% by weight of plastification avivage and 6% by weight of moisture. The casing is characterized by a strength at breaking of 63.7 MPa and an elongation of 9.5%.

We claim:
1. A process for producing cellulosic moldings from cellulose comprising the steps of:
   (a) forming a cellulose-water mixture by treating the cellulose hydrothermally with water in an water/cellulose ratio on a weight basis of at least 1 at a temperature in the range from about 100 to about 200° C. and under a pressure in the range from about 0.1 to about 1.5 MPa,
   (b) dissolving the treated cellulose in an aqueous solution of alkali metal hydroxide at a temperature of least 0° C. to form a homogeneous alkaline cellulose solution containing from about 5 to about 10% by weight cellulose and a maximum 10% by weight alkali metal hydroxide, and
   (c) forming the cellulosic moldings from said homogeneous alkaline cellulose solution by contacting and coagulating with an aqueous solution containing from about 1 to about 30% by weight of an acid.

2. The process according to claim 1, wherein the cellulose solution is filtered and/or de-aerated between steps (b) and (c).

3. The process according to claim 1, wherein the filterability coefficient of the cellulose solution is no higher than 1000, and a stability at 20° C. of at least 48 hours is produced in step (b).

4. The process according to claim 1, wherein the product coagulated in step (c) is washed with water and dried.

5. The process according to claim 1, wherein the duration of the hydrothermal treatment is in the range from about 1.0 to about 10 hours.

6. The process according to claim 1, wherein the cellulose-water mixture at the end of the hydrothermal treatment is non-explosively depressurized to the atmospheric pressure.

7. The process according to claim 6, wherein the cellulose-water mixture at the end of the hydrothermal treatment is depressurized in a time interval in the range from about 1 to about 30 minutes.

8. The process according to claim 1, wherein the hydrothermal treatment is carried out at a temperature in the range from about 120° to about 180° C.

9. The process according to claim 1, wherein the hydrothermal treatment is carried out at a pressure in the range from about 0.2 to about 1.0 MPa.

10. The process according to claim 1, wherein the cellulose solution of step (b) is formed in a time interval in the range from about 1 to about 300 minutes.

11. The process according to claim 1, including a pretreatment step of defibration and swelling of the cellulose at a temperature of at least 10° C. for a time interval ranging from 1 minute to about 24 hours in the presence of water, said pretreatment step performed prior to step (a).

12. The process according to claim 1, wherein the cellulose treated according to step (a) is characterized by an average weight degree of polymerization not lower than 200, a retention value in a range from about 60 to 100%, a crystallinity index not higher than 75% and a value of hydrogen bond energy in a range from 15 to 21 KJ/mole.

13. The process according to claim 1, wherein the cellulose dissolved in the alkali metal hydroxide solution in step (b) comprises at maximum 5% by weight Zn-compounds and/or at maximum 10% by weight urea.

14. The process according to claim 1, wherein the cellulose solution of step (c) is coagulated in an aqueous acid solution containing from 1 to about 25% by weight salts of organic and/or inorganic acid(s).

15. The process according to claim 1, including extrusion of the cellulose solution of step (c) through an annular nozzle to form a tubular casing, and introducing into the interior of said tubular casing a coagulation bath liquor comprising from about 5 to about 20% by weight acid and from about 5 to about 20% by weight sodium salt(s), said bath liquor having a temperature ranging from about 20 to about 95° C., (d) drawing the coagulated cellulose casing in a range of up to 100% of its original length in an aqueous bath at a temperature in the range from about 20 to about 95° C., and (e) treating the casing of step (d) with polyhydric alcohol(s) at a temperature in the range from about 20 to about 80° C. after removal of the coagulation bath liquor.

16. The process according to claim 15, wherein coagulation in step (c) is carried out at a temperature in the range from about 20 to about 95° C.

17. The process according to claim 15, wherein the drawing in step (d) is carried out in an aqueous bath comprising at maximum 10% by weight of an acid.

18. The process according to claim 15, wherein following step (e) the casing is subjected to a finishing treatment step selected from the group consisting of washing with water, wrinkling and drying.

19. The process according to claim 1, wherein the cellulosic moldings are fibers, foils, casings and beads.

* * * * *